J. K. SOMES.
BIAS-MEASURES.

No. 183,076. Patented Oct. 10, 1876.

Witnesses.
A. Ruppert,
James Thompson.

Inventor.
J. Kirk Somes
By S. E. Somes & Co.
Attorneys.

JAMES R. OSGOOD & CO. BOSTON.

UNITED STATES PATENT OFFICE.

J. KIRK SOMES, OF SPRINGFIELD, MASSACHUSETTS.

IMPROVEMENT IN BIAS-MEASURES.

Specification forming part of Letters Patent No. 183,076, dated October 10, 1876; application filed July 26, 1876.

*To all whom it may concern:*

Be it known that I, J. KIRK SOMES, of Springfield, in the county of Hampden and in the State of Massachusetts, have invented a new and useful Improvement in Bias-Measures; and I do hereby declare that the following is a full, clear, and exact description thereof, reference being had to the annexed drawings, making part of this specification, in which—

Figure 1:
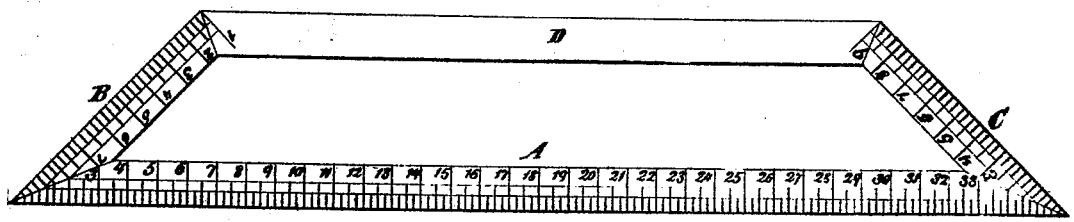

Figure 1 is a plan of my combined yard-stick and bias-measure. Figs. 2 to 6 show the various applications of the implement on a reduced scale.

The same letters of reference are used in all the figures in the designation of identical parts.

The nature of my invention consists in providing a yard-stick with a bias-bar at each end, the yard-stick and the bias-bars having suitable scales marked upon them on both sides, all of which enables one to use the implement without changing position or reversing the goods whether measuring from right to left, or from left to right.

To enable those skilled in the art to make and use my invention, I will proceed to describe its construction and operation.

The bar A of the implement constitutes the yard-stick, provided with a suitable scale on both sides. The bias-bars B and C project in reverse directions from the opposite ends of the yard-stick at an angle of forty-five degrees, and may be made one-quarter of a yard in length, more or less. Their outer ends are connected by a parallel bar, D. The bias-bars have scales upon each side, like the yard-stick.

Figure 2:
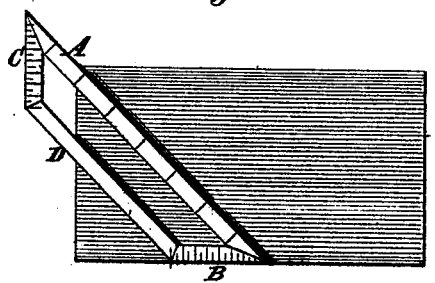
Figure 3:
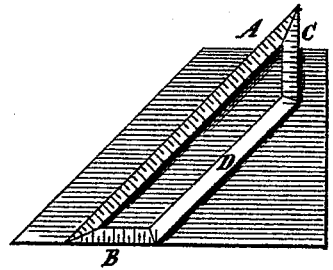
Figure 4:
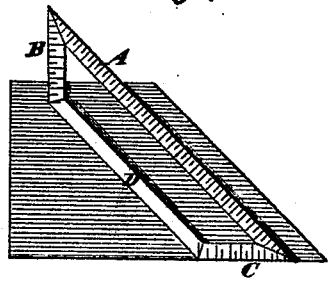
Figure 5:
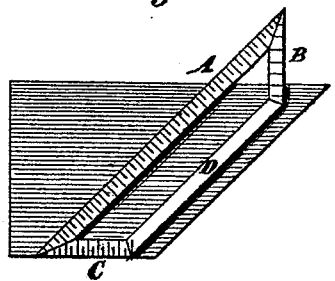
Figure 6:
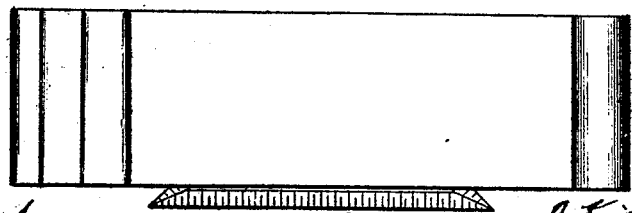

Figs. 2 and 3 show the application of the implement for measuring a bias piece from right to left, showing, respectively, the short side and the long side of the goods next to the person measuring; whereas Figs. 4 and 5 are illustrations in the same way of measuring from left to right. Fig. 6 exhibits the use of the implement as an ordinary yard-stick.

What I claim as my invention, and desire to secure by Letters Patent, is—

As an article of manufacture, the implement herein described, consisting of a yard-stick, with the shorter bias-bars at both ends graduated on both sides, and united at their inner ends by a bar parallel with the yard-stick, for the purpose set forth.

J. KIRK SOMES.

Witnesses:
  D. E. WEBSTER,
  E. WEBSTER.